US011723388B2

(12) United States Patent
Preat

(10) Patent No.: US 11,723,388 B2
(45) Date of Patent: Aug. 15, 2023

(54) METHODS FOR HEATING COMPOSITIONS COMPRISING EDIBLE INCLUSIONS

(71) Applicant: PURATOS N.V., Groot-Bijgaarden (BE)

(72) Inventor: Ludovic Preat, Waudrez (BE)

(73) Assignee: Puratos NV, Groot-Bijgaarden (BE)

( * ) Notice: Subject to any disclaimer, the term of this patent is extended or adjusted under 35 U.S.C. 154(b) by 353 days.

(21) Appl. No.: 16/954,479

(22) PCT Filed: Dec. 26, 2018

(86) PCT No.: PCT/EP2018/086879
§ 371 (c)(1),
(2) Date: Jun. 16, 2020

(87) PCT Pub. No.: WO2019/129784
PCT Pub. Date: Jul. 4, 2019

(65) Prior Publication Data
US 2021/0204570 A1 Jul. 8, 2021

(30) Foreign Application Priority Data

Dec. 26, 2017 (BE) .................................. 2017/5994

(51) Int. Cl.
*A23L 3/005* (2006.01)
*A23L 19/00* (2016.01)
*A23L 29/30* (2016.01)
*A23L 29/212* (2016.01)
*A23L 5/10* (2016.01)
*A23L 3/36* (2006.01)
*A23B 9/04* (2006.01)
*A23L 3/01* (2006.01)
*A23B 4/01* (2006.01)
*A23B 7/01* (2006.01)
*A23L 3/22* (2006.01)

(52) U.S. Cl.
CPC ................ *A23L 3/005* (2013.01); *A23B 4/01* (2013.01); *A23B 7/01* (2013.01); *A23B 9/04* (2013.01); *A23L 3/01* (2013.01); *A23L 3/22* (2013.01); *A23L 3/36* (2013.01); *A23L 5/15* (2016.08); *A23L 19/03* (2016.08); *A23L 29/212* (2016.08); *A23L 29/30* (2016.08); *A23V 2002/00* (2013.01)

(58) Field of Classification Search
CPC ... A23L 3/005; A23L 3/36; A23L 5/15; A23L 19/03; A23L 29/212; A23L 29/30; A23L 19/09; A23L 3/22; A23L 3/01; A23L 3/16–3/245; A23V 2002/00; A23B 4/01; A23B 5/01; A23B 7/01; A23B 9/04
USPC ............. 426/244–247; 99/358, 451; 219/771
See application file for complete search history.

(56) References Cited

U.S. PATENT DOCUMENTS

| 2,057,366 | A | * | 10/1936 | Chapman | A23B 7/0053 62/375 |
| 2,239,397 | A | * | 4/1941 | North | A23L 3/22 426/522 |
| 2,550,584 | A | * | 4/1951 | Mittelmann | A23L 3/01 392/314 |
| 3,770,461 | A | * | 11/1973 | Stewart, Jr. | A23L 9/12 426/399 |
| 4,597,945 | A | * | 7/1986 | Sugisawa | A61L 2/06 141/82 |
| 4,929,463 | A | * | 5/1990 | Meyer | A23L 3/18 426/531 |
| 4,974,504 | A | * | 12/1990 | Walraven | A23K 10/26 99/478 |
| 5,670,199 | A | * | 9/1997 | Swartzel | A23B 5/0055 426/244 |
| 5,741,539 | A | * | 4/1998 | Knipper | A23B 5/01 426/244 |
| 5,876,771 | A | * | 3/1999 | Sizer | A23L 3/225 426/333 |
| 8,834,947 | B2 | * | 9/2014 | Di-Principe | A23L 5/34 426/244 |
| 2006/0093717 | A1 | * | 5/2006 | Akkerman | A23L 3/165 426/520 |

(Continued)

FOREIGN PATENT DOCUMENTS

| EP | 2667111 A1 | 11/2013 |
| WO | 8910438 A1 | 11/1989 |

(Continued)

OTHER PUBLICATIONS

PCT International Search Report and Written Opinion; Application No. PCT/EP2018/086879, International filing date of Dec. 26, 2018, Puratos NV, Authorized Officer Thomas Saunders, dated Feb. 15, 2019, 11 pages.

(Continued)

*Primary Examiner* — Drew E Becker
(74) *Attorney, Agent, or Firm* — Patent Law Works LLP

(57) ABSTRACT

Methods of heating compositions comprising at least 20% (w/w) individually distinguishable edible inclusions are provided herein. The method of heating as disclosed herein comprises applying a first ohmic heating treatment to the composition, wherein the composition has at the end of the first ohmic heating treatment a temperature from 60° C. to 95° C.; applying a first holding step to the composition, wherein the temperature of the composition is at most 5° C. lower than the temperature of the composition after the first ohmic heating treatment; applying a second ohmic heating treatment to the composition, wherein the composition has at the end of the second ohmic heating treatment a temperature ranging from 75° C. to 110° C.; and applying a second holding step to the composition, wherein the temperature of the composition is at most 5° C. lower than the temperature of the composition after the second ohmic heating treatment, wherein the steps are performed as a continuous process with an initial back pressure of at least 4 bar.

14 Claims, No Drawings

(56) References Cited

U.S. PATENT DOCUMENTS

| | | | | |
|---|---|---|---|---|
| 2008/0017623 | A1* | 1/2008 | Dock | A23L 3/01 219/201 |
| 2008/0020110 | A1* | 1/2008 | Dock | A23L 3/005 99/483 |
| 2011/0287151 | A1* | 11/2011 | Simunovic | A23L 3/01 426/241 |
| 2013/0034644 | A1* | 2/2013 | Di-Principe | A23L 5/34 426/520 |
| 2015/0044336 | A1* | 2/2015 | Druga | A23L 5/15 426/232 |
| 2015/0050400 | A1* | 2/2015 | Timmermans | A23L 3/005 426/244 |
| 2015/0110933 | A1* | 4/2015 | Zack | A23L 3/005 392/314 |
| 2015/0374003 | A1* | 12/2015 | Druga | A23L 3/01 99/356 |
| 2021/0186040 | A1* | 6/2021 | Catelli | A23B 7/155 |

FOREIGN PATENT DOCUMENTS

| | | |
|---|---|---|
| WO | 2009066022 A1 | 5/2009 |
| WO | 2014173632 A1 | 10/2014 |

OTHER PUBLICATIONS

PCT International Preliminary Report on Patentability with Chapter II Demand; Application No. PCT/EP2018/086879, International filing date of Dec. 26, 2018, Puratos NV, Authorized Officer Lars-Oliver Romich, dated Oct. 28, 2019, 16 pages.

* cited by examiner ized food products are products containing pieces of fruits, vegetables, meat or fish, meatballs, ready meals, etc. So far, the food processing methods are essentially based on conventional heating treatments which may seriously damage the edible inclusions.

METHODS FOR HEATING COMPOSITIONS COMPRISING EDIBLE INCLUSIONS

CROSS REFERENCE TO RELATED APPLICATIONS

This application is a national phase entry under 35 U.S.C. § 371 of International Patent Application PCT/EP2018/086879, filed Dec. 26, 2018, designating the United States of America and published in English as International Patent Publication WO 2019/129784 A1 on Jul. 4, 2019, which claims the benefit under Article 8 of the Patent Cooperation Treaty to Belgium Patent Application Serial No. BE2017/5994, filed Dec. 26, 2017, the entireties of which are hereby incorporated by reference.

FIELD OF THE INVENTION

The present invention belongs to the technical field of food processing. More specifically, the present invention relates to compositions comprising individually distinguishable edible inclusions such as fruit preparations and methods for heating such compositions.

BACKGROUND

Nowadays, the food industry is offering more and more new food products with new textures and/or functionalities, such as the thermal stability. When dealing with texture, one of the main issues is how to preserve the integrity and the freshness of edible inclusions (e.g. fruit pieces) during and after the texturizing and thermal processing of a food product comprising such edible inclusions, for example in a thickened matrix such as a starch-based matrix.

Examples of texturized food products are products containing pieces of fruits, vegetables, meat or fish, meatballs, ready meals, etc. So far, the food processing methods are essentially based on conventional heating treatments which may seriously damage the edible inclusions.

The current techniques to prepare and/or conserve food products comprising edible inclusions include batch processing, which is usually performed in scraped steam heated kettles, and continuous processing, which is usually performed in scraped surface heat exchangers. Batch processing usually requires a long heating time to reach the required temperature in the food product. This may cause overcooking of the product. The consequences of such processing are an altered structure, colour and taste of the food product, as well as the formation of unwanted molecules (e.g. furans, hydroxymethylfurfural, etc.) in the food product. Furthermore heterogeneous cooking of the food product may occur during batch processing. Despite a faster heating, the impact of the cooking by continuous scraped surface heat exchanger on the integrity of food pieces remains significant, leading to damaged particles.

Ohmic heating (or direct resistance heating) is a process in which food liquids and solids are heated simultaneously by passing an electric current through them. Contrary to what happens during batch processing or during microwave heating, ohmic heating uniformly heats the food products. Furthermore, as a result of the absence of a hot wall, but also by reducing the fouling of treated food surfaces during processing, ohmic heating avoids the degradation of thermosensitive compounds through over-heating. Additional advantages are that ohmic heating can improve the food quality and saves cost and energy to processors.

The shelf life of ohmically processed foods is comparable to that of canned and sterile, aseptically processed products.

Current methods involving ohmic heating for preparing food products comprising starch and particles do not allow obtaining a homogeneous distribution of the conductivity in the food product, thereby leading to quality issues such as the formation of uncooked portions of the product.

There is therefore a need for improved processes to produce high-quality food products comprising starch and particles.

SUMMARY OF THE INVENTION

Present inventors have surprisingly found that (i) heating a composition comprising starch, and at least 20% individually distinguishable edible inclusions to a temperature ranging from 60° C. to 95° C. by ohmic heating, (ii) holding the composition (in the absence of ohmic heating) at a temperature which is at most 5° C. lower compared to the temperature of the composition at the end of the first ohmic heating treatment, (iii) heating the composition for a second time by ohmic heating to a temperature ranging from 75° C. to 110° C., wherein the temperature of the composition is at least 5° C. higher compared to the temperature of the composition at the end of the first ohmic heating treatment and (iv) holding the composition (in the absence of ohmic heating) at a temperature which is at most 5° C. lower compared to the temperature of the composition after the second ohmic heating treatment, wherein all steps are performed in a continuous manner, allows obtaining in a relatively short period of time a homogenously heated and/or cooked composition (e.g. there are no uncooked portions) with an excellent texture (e.g. homogenously texturized and/or thickened), taste and/or colour. Additionally, the composition obtained by the method of heating as disclosed herein has uniform levels of sterility and/or product quality. Furthermore, the method of heating as disclosed herein allows obtaining a composition with very little damage to and/or loss of the edible inclusions, resulting in a higher content of (intact) edible inclusions compared to compositions comprising at least 20% individually distinguishable edible inclusions heated using other (conventional) methods.

A first aspect provides a method for heating a pumpable composition comprising individually distinguishable edible inclusions comprising the steps of:

a) providing a pumpable composition comprising starch, at least 20% (w/w) individually distinguishable edible inclusions and optionally sugar or sugar substitute;

b) applying a first ohmic heating treatment to the composition in a continuous ohmic heater, wherein the composition has at the end of the first ohmic heating treatment a temperature ranging from 60° C. to 95° C.;

c) applying a first holding step to the composition in the absence of ohmic heating, wherein the temperature of the composition at the end of the first holding step is at most 5° C. lower compared to the temperature of the composition at the end of the first ohmic heating treatment;

d) applying a second ohmic heating treatment to the composition in a continuous ohmic heater, wherein the composition has at the end of the second ohmic heating treatment a temperature ranging from 75° C. to 110° C. and wherein the temperature of the composition at the end of the second ohmic heating treatment is at least 5° C. higher compared to the temperature of the composition at the end of the first ohmic heating treatment;

e) applying a second holding step to the composition in the absence of ohmic heating, wherein the temperature of the composition at the end of the second holding step is at most 5° C. lower compared to the temperature of the composition at the end of the second ohmic heating treatment;

f) optionally cooling the composition to a temperature ranging from 4° C. to 45° C.; and g) optionally packing the composition;

wherein steps a) to e) are performed as a continuous process, preferably with an initial back pressure of at least 4 bar.

In particular embodiments, the pumpable composition comprises from 20% to 88% (w/w) of individually distinguishable edible inclusions; from 10% to 40% (w/w) of sugar or sugar substitute; and/or from 2% to 7% (w/w) of starch.

In particular embodiments, the pumpable composition has an electrical conductivity of at least 0.014 S/m at 20° C. before applying the first ohmic heating treatment.

In particular embodiments, the average size of the individually distinguishable edible inclusions is ranging from 5 mm to 50 mm.

In particular embodiments, the first holding step is applied for a time period from 0.2 min to 10 min and/or the second holding step is applied for a time period from 0.25 min to 5 min.

In particular embodiments, the composition is not subjected to a heat treatment in the first and/or the second holding step(s).

In particular embodiments, the first and second holding step each comprise passing the composition through one or more heat insulated conduit(s).

In particular embodiments, the edible inclusions are one or more edible inclusions selected from the group consisting of fresh, frozen or dried whole fruits, fresh, frozen or dried fruit pieces, (whole) grains, (whole) seeds, nuts or nut pieces, whole vegetables or vegetable pieces, fish or fish pieces, and meat or meat pieces, or combinations thereof.

In particular embodiments, the pumpable composition further comprises one or more texturing agents, acidity regulators, spices, flavoring agents, colouring agents and/or aromatizing agents.

In particular embodiments, the cooling of the composition is performed at a cooling rate of at least 5° C./min.

DETAILED DESCRIPTION

The present invention will be described with respect to particular embodiments but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The inventors have surprisingly found that (i) heating a composition comprising starch and at least 20% individually distinguishable edible inclusions to a temperature ranging from 60° C. to 95° C. by ohmic heating, (ii) holding the composition (in the absence of ohmic heating) at a temperature which is at most 5° C. lower compared to the temperature of the composition at the end of the first ohmic heating treatment, (iii) heating the composition for a second time by ohmic heating to a temperature ranging from 75° C. to 110° C., wherein the temperature of the composition is at least 5° C. higher compared to the temperature of the composition at the end of the first ohmic heating treatment and (iv) holding the composition (in the absence of ohmic heating) at a temperature which is at most 5° C. lower compared to the temperature of the composition after the second ohmic heating treatment, wherein all steps are performed in a continuous manner, allows obtaining in a relatively short period of time a homogenously heated and/or cooked composition (e.g. there are no uncooked portions) with an excellent texture (e.g. homogenously texturized and/or thickened), taste and/or colour. Additionally, the composition obtained by the method of heating as disclosed herein has uniform levels of sterility and/or product quality. Furthermore, the method of heating as disclosed herein allows obtaining a composition with very little damage to and/or loss of the edible inclusions, resulting in a higher content of (intact) edible inclusions compared to compositions comprising at least 20% individually distinguishable edible inclusions heated using other (conventional) methods. More particularly, after the method of heating as disclosed herein, most (e.g. at least 65%) of the individually distinguishable edible inclusions can be recovered from the composition and/or most (e.g. at least 65%) of the individually distinguishable edible inclusions remain intact during the heating process. Additionally, the method of heating as disclosed herein prevents blockage of the conduits of the heating apparatus due to uncontrolled thickening and/or texturizing of the pumpable composition. Accordingly, the composition obtained by the method of heating as disclosed herein (i.e. comprising two ohmic heating steps) has better characteristics than the composition obtained by methods of heating known in the art, for example, methods of heating comprising only one step of ohmic heating.

Accordingly, a first aspect provides a method for heating a pumpable composition comprising individually distinguishable edible inclusions comprising the steps of:

a) providing a pumpable composition comprising starch, at least 20% (w/w) individually distinguishable edible inclusions and optionally sugar or sugar substitute;

b) applying a first ohmic heating treatment to the composition in a continuous ohmic heater, wherein the composition has at the end of the first ohmic heating treatment a temperature ranging from 60° C. to 95° C.;

c) applying a first holding step to the composition in the absence of ohmic heating, wherein the temperature of the composition at the end of the first holding step is at most 5° C. lower compared to the temperature of the composition at the end of the first ohmic heating treatment;

d) applying a second ohmic heating treatment to the composition in a continuous ohmic heater, wherein the composition has at the end of the second ohmic heating treatment a temperature ranging from 75° C. to 110° C. and wherein the temperature of the composition at the end of the second ohmic heating treatment is at least 5° C. higher compared to the temperature of the composition at the end of the first ohmic heating treatment;

e) applying a second holding step to the composition in the absence of ohmic heating, wherein the temperature of the composition at the end of the second holding step is at most 5° C. lower compared to the temperature of the composition at the end of the second ohmic heating treatment;

f) optionally cooling the composition to a temperature ranging from 4° C. to 45° C.; and g) optionally packing the composition;

wherein steps a) to e), optionally steps a) to g), are performed as a continuous process, preferably with an initial back pressure of at least 4 bar.

The term "pumpable" as used herein refers to the capability of a composition to flow or to be moved forward by a pressure exerted by a pump. For example, the composition may have the capability to overcome the wall friction and/or the resistance created at bends and/or tapers of a conduit through which the composition is moved.

The phrase "individually distinguishable edible inclusions" as used herein refers to the capability of perceiving edible inclusions with the human eye as separate entities. The inclusions are preferably individually distinguishable at each time point during and just after the heating process as disclosed herein and/or more than 60% of inclusions, preferably more than 65% of the edible inclusions can be recovered after the heating process. The individually distinguishable edible inclusions may be intact or whole food, diced pieces, cuts, fresh pieces, dehydrated pieces or frozen pieces (e.g. Individually Quick Frozen). If the edible inclusions are frozen pieces, the pieces are preferably completely thawed before initiating the heating process as described herein. The edible inclusions may be grains, seeds, nuts, pieces of vegetable, meat, fish and/or fruits, or combinations hereof. Preferably, the food pieces are entire fruit(s) or pieces of fruit(s), such as dices or slices.

In particular embodiments, the pumpable composition may comprise from 20% to 90%, from 20% to 88% (w/w), from 30% to 88% (w/w), from 40% to 88% (w/w), from 50% to 88% (w/w), from 60% to 82% (w/w), from 70% to 88% (w/w), or from 80% to 88% (w/w) of individually distinguishable edible inclusions. Preferably, the pumpable composition comprises from 60% to 82% (w/w) of individually distinguishable edible inclusions. For example, the pumpable composition may comprise 70% (w/w) of individually distinguishable edible inclusions.

In particular embodiments, at least 60%, at least 65%, at least 70%, at least 80%, or at least 90%, preferably at least 65% of the individually distinguishable edible inclusions can be recovered after the method of heating as described herein. The recovery of edible inclusions may be calculated as the ratio of the weight of the inclusions after sieving and/or rinsing the composition comprising the edible inclusions (g) over the start weight (g) of the inclusions multiplied with the initial weight percentage of inclusions.

In particular embodiments, at least 60%, at least 65%, at least 70%, at least 80%, or at least 90%, preferably at least 65% of the individually distinguishable edible inclusions maintain their integrity upon the method of heating as described herein. The integrity of the edible inclusions may be calculated as the ratio of the weight of the intact, individually distinguishable, edible inclusions before being subjected to the method of heating as described herein (g) over the weight of the individually distinguishable, edible inclusions after sieving and/or rinsing the composition comprising the edible inclusions (g) which has been subjected to the method of heating as described herein. The integrity may be determined by washing a certain quantity of the pumpable composition which has been subjected to the method of heating as described herein with cold water through a sieve with a 1-2 mm mesh, and by counting, within the remaining edible inclusions, the percentage of intact edible inclusions (w/w).

In particular embodiments, at most 30%, at most 25%, or at most 20%, preferably at most 25% of the individually distinguishable edible inclusions are damaged upon the method of heating as described herein.

The damage to edible inclusions may be determined by any method known by the skilled person. For example, a panel of experts may evaluate the external appearance of edible inclusions, either contained within or recovered from the pumpable composition comprising individually distinguishable edible inclusions, and the experts will consider the edible inclusions damaged if there are any visible signs of damage.

The skilled person will understand that the integrity of the edible inclusion may be considered as being maintained when the edible inclusion can be recovered from the composition after being subjected to the method of heating as described herein and having for at least 90%, preferably for at least 95% its original shape (i.e. before being subjected to the method of heating as described herein). For example, if the edible inclusions initially have a cubical shape, the integrity of the edible inclusions may be considered as being maintained when the shape of the edible inclusion which is recovered from the composition after being subjected to the method of heating as described herein still has a cubical shape.

In particular embodiments, when the edible inclusions are entire fruits, such as cherries and strawberries, the integrity of the edible inclusion may be considered as being maintained when the whole fruit can be recovered as one continuous piece and/or when the external shell or peel of the fruit is continuous (i.e. not disrupted, not opened). In particular embodiments, the weight percentage of the edible inclusions in the composition after heat processing as disclosed herein may be at least 40%, at least 50%, at least 60%, or at least 70%, preferably at least 50% of the weight percentage of the edible inclusions in the initial composition (i.e. before heat processing). Said ratio may be measured by washing the same weight of composition, obtained before and after processing, with cold water through a sieve with a 1-2 mm mesh and by weighing the washed edible inclusions.

In particular embodiments, the individually distinguishable edible inclusions may have an average size from 3 mm to 100 mm, from 5 mm to 90 mm, from 5 mm to 80 mm, from 10 mm to 80 mm, from 15 mm to 80 mm, from 5 mm to 70 mm, from 5 mm to 60 mm, from 5 mm to 50 mm, or from 10 mm to 50 mm. Preferably, the individually distinguishable edible inclusions may have an average size from 5 mm to 80 mm. More preferably, the individually distinguishable edible inclusions may have an average size from 5 mm to 50 mm.

The term "average size" as used herein refers to the average diameter if the inclusions are spherical and to the average volume-based particle size if the inclusions comprised within the composition are non-spherical. The volume-based particle size equals the diameter of the sphere that has the same volume as a given particle. The volume-based particle size may be determined by any means known in the art to determine volume-based particle size of non-spherical particles, for example, using the formula: $D=2*(3V/4n)^{1/3}$; wherein D is the diameter of the representative sphere and V is the volume of the particle.

In particular embodiments, the maximum diameter of the individually distinguishable edible inclusions may be at most 100 mm, at most 90 mm, at most 80 mm, at most 70 mm, at most 60 mm, or at most 50 mm. Preferably, the maximum diameter of the individually distinguishable edible inclusions may be at most 80 mm. More preferably, the maximum diameter of the individually distinguishable edible inclusions may be at most 50 mm.

In particular embodiments, the edible inclusions may be one or more edible inclusions selected from the group consisting of fresh, frozen or dried whole fruits, fresh, frozen or dried fruit pieces, (whole) grains, (whole) seeds, nuts or nut pieces, whole vegetables or vegetable pieces, fish or fish pieces, and meat or meat pieces, or combinations thereof. Preferably are fresh, frozen or dried whole fruit or fruit pieces. More preferably said edible inclusions are fresh, frozen or dried whole fruit or fruit pieces selected from the group consisting of strawberries, berries, cherries, apricots, peaches, mangos, raisins, figs, dates, kiwis, pineapples, passion fruits and prunes or pieces thereof.

In particular embodiments, the edible inclusions may be one or more edible inclusions selected from the group consisting of entire berries, entire cherries, entire strawberries, half apricots, apple slices, peach slides or mango dices.

The term "starch" or "modified starch" as used herein may refer to any starch or a combination of one or more starches well known by the skilled artisan for preparing compositions comprising edible inclusions. The starch as disclosed herein may be modified starch. Examples of starch modifications include physical (e.g. drum drying, extrusion cooking, spray drying, small granule starches, annealing and heat-moisture treatment, high hydrostatic pressure treatment), enzymatical and chemical modifications. Non-limiting examples of starches include arrowroot, corn starch, waxy corn starch (i.e. waxy maize starch), katakuri starch, potato starch, sago, tapioca, hydroxypropyl-distarch phosphate (E1442), acetylated distarch adipate (E1422) and physically modified starches.

In particular embodiments, the starch in the composition as disclosed herein may be one or more starches selected from the group consisting of waxy maize starch, hydroxypropyl distarch phosphate, acetylated distarch adipate and physically modified starches.

In particular embodiments, the pumpable composition may comprise from 1% to 10% (w/w), from 2% to 8% (w/w), from 2% to 7% (w/w), or from 3% to 6% (w/w) of starch. Preferably, the pumpable composition comprises from 2% to 7% (w/w) of starch. For example, the pumpable composition may comprise 5% (w/w) of starch.

The phrase "sugar or sugar substitute" as used herein refers to a food-grade substance with a sweet taste. The sugar or sugar substitute may be any sugar, sugar substitute, or a combination thereof suitable for use in the preparation of pumpable composition comprising individually distinguishable edible inclusions. Sugar substitutes may also be artificial sweeteners. Non-limiting examples of sugars or sugar substitutes are monosaccharides (e.g. fructose, glucose, dextrose and galactose), disaccharides (e.g. sucrose, such as sucrose from sugar beet or sugar cane), lactose and maltose), oligosaccharides (e.g. oligofructose, maltodextrin, raffinose and stachyose), polysaccharides, agave nectar, honey, sucralose, *Stevia* leaf extract, acesulfame potassium (Ace-K), advantame, neotame, sucralose and sugar alcohols (e.g. sorbitol, xylitol and mannitol).

In particular embodiments, the sugar or sugar substitute may be present in powdered form or as a syrup.

In particular embodiments, the sugar or sugar substitute may be one or more sugars or sugar substitutes selected from the group consisting of sucrose, glucose, fructose, glucose syrup, maltodextrins, sorbitol, maltitol and glycerol.

In particular embodiments, the pumpable composition may comprise from 5% to 50% (w/w), from 10% to 40% (w/w), from 10% to 30% (w/w), or from 15% to 20% (w/w) of sugar or sugar substitute. Preferably, the pumpable composition comprises from 10% to 40% (w/w) of sugar or sugar substitute.

In particular embodiments, the pumpable composition may comprise from 20% to 88% (w/w) of individually distinguishable edible inclusions; from 10% to 40% (w/w) of sugar or sugar substitute; and/or from 2% to 7% (w/w) of starch.

In particular embodiments, the pumpable composition may comprise from 60% to 82% (w/w) of individually distinguishable edible inclusions; from 15% to 20% (w/w) of sugar or sugar substitute; and/or from 3% to 6% (w/w) of starch.

In particular embodiments, the pumpable composition may further comprise one or more texturizing agents (e.g. pectin(s), xanthan gum(s), agar and hydrocolloids), acidity regulators (e.g. tartaric acid, malic acid, citric acid, and salts thereof), spices, flavoring agents, fats, oils, colouring agents and/or aromatizing agents.

In particular embodiments, the pumpable composition may comprise from 0.1% to 5% (w/w) of texturizing agents, preferably from 0.3% to 3% (w/w) of texturizing agents.

In particular embodiments, the pumpable composition may comprise from 0.1% to 2% (w/w) of acidity regulators, preferably from 0.5% to 1.5% (w/w) of acidity regulators.

In particular embodiments, the pumpable composition may be a food product, such as a jam, a minestrone, a sauce, a spread, a batter, a compote, or a filling or a topping for bakery products (e.g. pie filling, cake filling, cake topping). Preferably, the pumpable composition is a filling or a topping for bakery products (e.g. pie filling, cake filling, cake topping).

In particular embodiments, step a) of the method of heating as disclosed herein may comprise preparing the pumpable composition. The pumpable composition may be prepared by first dispersing the starch in water (e.g. from 5 to 10% (w/w) of water in the pumpable composition) and heating the solution to a temperature from 45° C. to 65° C.; and next adding the other ingredients (e.g. edible inclusions, sugar, texturizing agents, acidity regulators) of the composition to the starch solution. In particular embodiments, the pumpable composition may be prepared by first dispersing starch together with a part (e.g. 50%) or all of the sugar in water and subsequently adding the other ingredients to the starch/sugar solution.

In particular embodiments, step a) of the method of heating as disclosed herein may comprise providing a pumpable composition comprising starch, at least 20% (w/w) individually distinguishable edible inclusions, and optionally sugar or sugar substitute, wherein the temperature of the pumpable composition is from 10° C. to 50° C., from 15° C. to 50° C., from 20° C. to 50° C., or from 20° C. to 40° C., preferably from 20° C. to 50° C.

In particular embodiments, the pumpable composition comprising starch, at least 20% (w/w) individually distinguishable edible inclusions, and optionally sugar or sugar substitute may be completely thawed in step a) of the method of heating as disclosed herein. More particularly, the temperature of the liquid phase and the edible inclusions within the pumpable composition is preferably well balanced or homogenous.

In particular embodiments, the pumpable composition may have a conductivity of at least 0.014 S/m, at least 0.050 S/m, at least 0.1 S/m, at least 0.2 S/m, or at least 0.25 S/m, at 20° C. before applying the first ohmic heating treatment. Preferably, the pumpable composition has a conductivity of at least 0.014 S/m at 20° C. before applying the first ohmic heating treatment.

The term "electrical conductivity" as used herein refers to the ability of a material to conduit or carry an electric current. Electrical conductivity has SI Unites of Siemens per meter (S/m). The skilled person will understand that materials such as metals and plasma typically have a high electrical conductivity, while electrical insulators, such as glass and pure water, have a poor electrical conductivity. Furthermore, the skilled person will also understand that the temperature influences the conductivity of a material. For example, upon heating, the electrical conductivity of a metal will decrease. The electrical conductivity may be determined by any method for measuring electrical conductivity of compositions comprising individually distinguishable edible inclusions known by the skilled person. For example, the conductivity of a fixed quantity of a pumpable composition (e.g. 500 g) may be determined in a polypropylene recipient using two titanium electrodes at a fixed distance (e.g. 20 cm) and a 50 V current, at a temperature of 25° C.

The conductivity of the pumpable composition as disclosed herein refers to the conductivity of the pumpable composition as a whole, i.e. the liquid phase as well as the individually distinguishable edible inclusions. The skilled person will understand that the conductivity of the liquid phase and the individually distinguishable edible inclusions is preferably the same.

The term "ohmic heater" or "joule heater" as used herein refers to an electrical heating device that uses the electrical resistance of a pumpable or flowable composition to generate heat that is produced directly within the composition itself by Joule effect, as an alternated electric current passes through a conducting material. This results in a transformation of energy, causing a temperature rise. Ohmic heaters typically use two or more electrodes to impart the current upon the pumpable or flowable composition. The ohmic heater can be set up as a static system in container vessel or with continuous flow through it (i.e. continuous or flow-through ohmic heater). The ohmic heating treatment as disclosed herein may be performed by any suitable equipment for continuous ohmic heating of compositions comprising inclusions. In a flow through situation, the ohmic heater electrodes can be arranged in one of the following configurations: parallel plates, collinear, staggered rods or parallel rods. The electrodes of the ohmic heater can be made from any electrical conducting materials suitable therefore, such as stainless steel. The skilled person will understand that the ohmic heater may comprise one or more ohmic heating units or stages in series. In particular embodiments, the one or more ohmic heating units are interconnected by one or more non-heating units, such as a holding segment as described elsewhere herein. The term "ohmic heating unit" or "ohmic heating stage" as used herein refers to a heating section between two continuous electrodes, which are located parallel to each other and which are located either parallel or perpendicular to the flow of the composition. Preferably, the ohmic heating units are tubular and/or the electrodes are stainless steel annular electrodes.

The term "ohmic heating treatment" as used herein, refers to a period of treating or subjecting a pumpable or flowable composition to ohmic heating generated by one or more ohmic heating units (e.g. two or more ohmic heating units in series), during which the pumpable or flowable composition is in a continuous motion. Such an ohmic heating treatment may comprise steps such as transferring said pumpable or flowable composition into one or more ohmic heating unit(s) and pumping the composition through the one or more ohmic heating unit(s) and simultaneously applying an electric current through said composition.

In particular embodiments, the composition may have at the end of the first ohmic heating treatment a temperature from 60° C. to 95° C., from 65° C. to 85° C., or from 65° C. to 75° C. Preferably, the composition has at the end of the first ohmic heating treatment a temperature from 60° C. to 85° C. More preferably, the composition has at the end of the first ohmic heating treatment a temperature from 60° C. to 75° C.

The skilled person will understand that during the first ohmic heating treatment, the temperature of the composition typically gradually rises to the desired temperature, and reaches the desired temperature at the end of the treatment. The same applies to the second ohmic heating treatment.

In particular embodiments, the composition may have at the end of the second ohmic heating treatment a temperature from 75° C. to 110° C., from 80° C. to 100° C., from 85° C. to 100° C., or from 90° C. to 100° C., preferably from 85° C. to 100° C.; wherein the temperature of the composition at the end of the second ohmic heating treatment is at least 5° C., at least 6° C., at least 7° C., at least 8° C., at least 9° C., or at least 10° C., preferably at least 10° C., higher compared to the temperature of the composition at the end of the first ohmic heating treatment.

In particular embodiments, the internal diameter of the fluid passage ways of the one or more ohmic heating units is at least 30 mm, at least 40 mm, at least 50 mm, at least 60 mm, at least 70 mm, at least 80 mm, at least 90 mm, or at least 100 mm, preferably at least 50 mm.

In particular embodiments, the internal diameter of the fluid passage ways of the one or more ohmic heating units and the internal diameter of the holding conduits is equal and/or have a ratio of 1:1.

In particular embodiments, the internal diameter of the fluid passage ways of the one or more ohmic heating units and the internal diameter of the holding conduits In particular embodiments, the first ohmic heating treatment may be performed for a period from 0.1 to 5 min, from 0.15 to 4 min, from 0.15 to 3 min, or from 0.15 to 2 min. Preferably, the first ohmic heating treatment is performed for a period from 0.15 to 2 min.

In particular embodiments, the second ohmic heating treatment may be performed for a time period from 0.10 to 10 min, from 0.15 to 7.5 min, from 0.20 to 5 min, or from 0.25 to 5 min. Preferably, the second ohmic heating treatment is performed for a time period from 0.25 to 5 min.

In particular embodiments, the applied electrical power in the first ohmic heating treatment is at least 10 kW, at least 11 kW, at least 12 kW, at least 13 kW, at least 14 kW, at least 15 kW, at least 16 kW, at least 17 kW, at least 18 kW, at least 19 kW, or at least 20 kW. Preferably, the applied electrical power in the first ohmic heating treatment is at least 15 kW.

In particular embodiments, one or more ohmic heating units are required to reach the desired temperature. For example, two or more continuous ohmic heating units may be placed in series.

In particular embodiments, the first ohmic heating treatment is performed using one ohmic heating unit of the ohmic heater and the second ohmic heating treatment is performed using two ohmic heating units of the ohmic heater. The ohmic heating unit used for the first ohmic heating treatment is different from the two ohmic heating units of the second ohmic heating treatment to ensure a continuous flow of the pumpable composition.

In particular embodiments, one or more continuous ohmic heating unit(s) of the ohmic heater each may comprise a conduit, for passing through the pumpable composition while imparting a current upon the composition, wherein the conduit of each heating unit may have a length of at least 70 cm, at least 80 cm, at least 90 cm, at least 100 cm, at least 110 cm, at least 120 cm, at least 130, preferably at least 100 cm.

In particular embodiments, the conduit of each heating unit is substantially composed out of glass.

The term "holding step" as used herein refers to keeping a pumpable composition within a certain temperature range, as close to a certain temperature as possible for a certain period of time, and/or preventing a pumpable composition from cooling down; wherein the pumpable composition is in continuous motion. As disclosed herein, the holding step typically follows an ohmic heating treatment. The temperature of the composition during the holding step as disclosed herein may be at most at most 5° C. lower compared to the temperature of the composition after the ohmic heating treatment, which was applied to the composition just before the particular holding step.

In particular embodiments, the composition is not subjected to a heat treatment in the first and/or the second holding step.

In particular embodiments, the first ohmic heating step is followed by a first holding step in the absence of ohmic heating, wherein the temperature of the composition at the end of the first holding step is at most 5° C., at most 4° C., at most 3° C., at most 2° C., at most 1° C., preferably at most 2° C., lower compared to the temperature of the composition at the end of the first ohmic heating treatment. Preferably, the temperature of the composition is kept at a steady-state value.

In particular embodiments, the first holding step may be applied for a time period from 0.05 min to 15 min, from 0.10 min to 12.5 min, from 0.15 min to 10 min, or from 0.2 min to 10 min. Preferably, the first holding step is applied for a time period from 0.2 min to 10 min.

In particular embodiments, the second ohmic heating step is followed by a second holding step in the absence of ohmic heating, wherein the temperature of the composition at the end of the second holding step is at most 5° C., at most 4° C., at most 3° C., at most 2° C., at most 1° C., preferably at most 2° C., lower compared to the temperature of the composition at the end of the second ohmic heating treatment. Preferably, the temperature of the composition is kept at a steady-state value.

In particular embodiments, the second holding step may be applied for a time period from 0.05 min to 15 min, from 0.10 min to 12.5 min, from 0.15 min to 10 min, or from 0.2 min to 10 min. Preferably, the second holding step is applied for a time period from 0.2 min to 10 min.

In particular embodiments, the first holding step may be applied for a time period which is longer than the time period in which the second holding step is applied.

In particular embodiments, the first holding step is applied for a time period from 0.2 min to 1 min and the second holding step is applied for a time period from 0.75 min to 5 min.

The term "conduit", "tube", "duct" or "channel" as used herein refer to an enclosed, hollow, passage through which a pumpable, flowable composition may be conveyed. Non-limiting examples of shapes of conduits are rectangular, tubular, triangular and trapezoidal.

In particular embodiments, the heat insulated conduit is tubular. The tubular shape may promote the flow of the pumpable composition through the conduit and/or may prevent damaging of the individually distinguishable edible inclusion comprised within the composition.

In particular embodiments, the heat insulated conduit is linear in at least 50%, at least 60%, at least 70%, at least 80%, or at least 90% of its length.

The term "tubular" as used herein refers to the shape of a cylinder, more particularly a long, round, and hollow shape.

The term "heat insulated" as used herein refers to comprising, essentially consisting of (e.g. at least 75% (w/w)), being composed of, covered with, and/or lined with a material that prevents and/or reduces the passage, transfer, and/or leakage of heat to the environment. The skilled person will understand that thermal insulation may be achieved with specially engineered methods or processes, as well as with suitable object shapes and materials. The heat insulating capability of a material is typically determined by thermal conductivity (k). Low thermal conductivity is typically equivalent to high insulating capability (R-value). In the SI system of units, thermal conductivity is measured in watts per meter-kelvin, $(W \cdot m^{-1} \cdot K^{-1})$; wherein watt is the unit of power, meter is the unit of distance, and kelvin is the unit of temperature.

The heat insulated conduit as referred to herein may also be two or more conduits in series, wherein said two or more conduits may comprise, essentially consist of (e.g. at least 75% (w/w)), be composed of, covered with, and/or lined with a different heat insulating material.

In particular embodiments, the heat insulated conduit may comprise or essentially consist of (e.g. at least 75% (w/w)) or may be composed of, covered with, and/or lined with a material having a thermal conductivity from 0.025 W/mK to 0.075 W/mK, from 0.030 W/mK to 0.050 W/mK, or from 0.034 W/mK to 0.042 W/mK. Preferably, the heat insulated conduit comprises, essentially consists of (e.g. at least 75% (w/w)) or is composed of, covered with, and/or lined with a material having a thermal conductivity from 0.034 W/mK to 0.042 W/mK. In particular embodiments, the heat insulated conduit may comprise or essentially consist of (e.g. at least 75% (w/w)) or may be composed of, covered with and/or lined with one or more synthetic foams (e.g. polystyrene foam, polyurethane foam, phenol acid hard foam, polyvinylchloride (PVC)-foam, or ditto), glass fibre sheets, rubber, stagnant air, helium or rock wool, preferably rock wool.

In particular embodiments, the first and/or second holding steps may comprise passing the pumpable composition through a heat insulated conduit with an (internal) diameter of at least 30 mm, at least 40 mm, at least 50 mm, at least 60 mm, at least 70 mm, at least 80 mm, at least 90 mm, or at least 100 mm, preferably at least 50 mm. For example, the heat insulated conduit may have an (internal) diameter of 50 mm. The skilled person will understand that the (internal) diameter of the heat insulated conduit is preferably equal to or larger than the average size of the individually distinguishable edible inclusions.

In particular embodiments, the first and/or second holding steps may comprise passing the composition through one or more heat insulated conduit(s), each with a length of at least 100 cm, at least 110 cm, at least 120 cm, at least 130 cm, at least 140 cm, at least 150 cm, at least 160 cm, at least 170 cm, or at least 180 cm, preferably at least 150 cm. For example, the heat insulated conduit may have a length of 160 cm.

In particular embodiments, the length of the one or more heat insulated conduit(s) of the second holding step is larger than the length of the one or more heat insulated conduit(s) of the first holding step. For example, the length of the one or more heat insulated conduit(s) of the first holding step may be at least 100 cm and the length of the one or more heat insulated conduit(s) of the second holding step may be at least 300 cm.

In particular embodiments, the method for heating a pumpable composition as disclosed herein may further comprise a step of cooling the pumpable composition to a temperature ranging from 4° C. to 45° C.; after the second holding step.

The term "cooling" as used herein refers to a reduction in temperature of the pumpable composition. For example, the pumpable composition may transfer thermal energy via thermal radiation, heat conduction or convection. The cooling may be performed by any method and/or means known in the art for cooling pumpable compositions comprising individually distinguishable edible inclusions, preferably the composition is cooled by active cooling means. Non-limiting examples of methods of cooling are air cooling, air conditioning, evaporative cooling, Peltier cooling, contact cooling, liquid cooling and/or refrigeration. For example, the pumpable composition may be passed through a heat exchanger, such as a tubular heat exchanger.

In particular embodiments, the pumpable composition may be cooled at a cooling rate of at least 5° C./min, at least 6° C./min, at least 7° C./min, at least 8° ° C./min, at least 9° C./min, or at least 10° C. min, preferably of at least 8° C./min. For example, the pumpable composition may be cooled at a cooling rate of 8.3° C./min. Cooling the pumpable composition after the second holding step at a cooling rate of at least 5° C./min improves the colour and texture of the pumpable composition.

In particular embodiments, the pumpable composition may be cooled to a temperature of at most 45° C., at most 40° C., at most 35° C., at most 30° C., at most 25° C., at most 20° C., at most 15° C., at most 10° C., or at most 5° C. Preferably, the pumpable composition is cooled to a temperature of at most 45° C.

In particular embodiments, the pumpable composition may be cooled to a temperature from 0° C. to 50° C., from 4° C. to 45° C., from 4° C. to 40° C., from 4° C. to 35° C., from 4° C. to 30° C., from 4° C. to 25° C., from 4° C. to 20° C., from 4° C. to 15° C., or from 4° C. to 10° C. Preferably, the pumpable composition is cooled to a temperature from 4° C. to 45° C.

In particular embodiments, the method for heating a pumpable composition comprising individually distinguishable edible inclusions as disclosed herein may comprise a step of packing the composition; after the second holding step and optionally after the cooling step.

The term "packaging" as used herein refers to wrapping or containing the pumpable composition in one or more materials to protect, to portion and/or to store the pumpable composition. Non-limiting examples of packages for the pumpable composition subjected to the heating process as described herein are aseptic pouches, sealed buckets and stainless steel containers.

As described earlier, the steps of the method for heating a pumpable composition comprising individually distinguishable edible inclusions as disclosed herein are performed as a continuous process, and are preferably performed consecutively.

The term "continuous" as used herein refers to a process performed without interruption (e.g. a process marked by uninterrupted extension time).

In particular embodiments, steps a) to e) of the method for heating a pumpable composition comprising individually distinguishable edible inclusions as disclosed herein, more preferably steps a) to g) of the method for heating a pumpable composition comprising individually distinguishable edible inclusions as disclosed herein, are performed consecutively and as a continuous process.

The continuity of the process is guaranteed by physically interconnecting the one or more ohmic heating unit(s) used in the first and second ohmic heating steps and the one or more heat insulated conduits used in the first and second holding steps.

Accordingly, in particular embodiments, the one or more heat insulated conduit(s) and the one or more ohmic heating unit(s) are physically interconnected. Preferably, the one or more ohmic heating unit(s) used in the first and second ohmic heating steps and the one or more heat insulated conduit(s) used in the first and second holding steps have the same shape and/or diameter. Preferably, the one or more ohmic heating unit(s) used in the first and second ohmic heating steps and the one or more heat insulated conduit(s) used in the first and second holding steps are tubular.

Furthermore, a pressure may be applied to the pumpable composition in order to move the pumpable composition in a continuous way through the one or more interconnected ohmic heating unit(s) and one or more heat insulated conduit(s). In particular embodiments, the continuous pressure applied to the pumpable composition to overcome back pressure may be at least 4 bar, at least 5 bar, at least 6 bar, at least 7 bar, at least 8 bar, at least 9 bar, or at least 10 bar, preferably at least 4 bar. In particular embodiments, the operating pressure at the beginning of the line (i.e. immediately after the pressure generator (e.g. pump) and before the ohmic heating units and the heat insulated conduits) may at least 4 bar, at least 5 bar, at least 6 bar, at least 7 bar, at least 8 bar, at least 9 bar, or at least 10 bar, preferably at least 4 bar.

The term "back pressure" as used herein refers to the pressure given by at least the ohmic heating units, the heat insulated conduits and the pumpable composition which the pump needs to overcome to establish a forward flow of the pumpable composition through at least the ohmic heating units and the heat insulated conduits. The initial back pressure is the pressure at the beginning of the line when the line is empty (i.e. before starting feeding the line with the composition). The initial back pressure is normally given by the receiving pressurized tank, which is typically located at the end of the line (i.e. following the ohmic heating units and the heat insulated conduits). In particular embodiments, the initial backpressure at the beginning of the line (i.e. immediately after the pressure generator (e.g. pump) and before the ohmic heating units and the heat insulated conduits) may be at least 4 bar, at least 5 bar, at least 6 bar, at least 7 bar, at least 8 bar, at least 9 bar, or at least 10 bar, preferably at least 4 bar. The back pressure will gradually decrease upon filling of the line by the pumpable composition. However, as the viscosity of the pumpable composition will increase as a result of the ohmic heating applied thereto, the pressure which the pump will have to overcome in order to maintain the flow of the pumpable composition will also increase again. The term "line" as used herein, refers to the conduits (i.e. comprising the ohmic heating units and the heat insulated conduits) located in the apparatus for heating a pumpable composition in series, through which the pumpable composition may flow in a continuous manner.

In particular embodiments, the method of heating a pumpable composition comprising individually distinguishable edible inclusions as disclosed herein may be performed in an aseptic environment. More particularly, by interconnecting at least the ohmic heating unit(s) of the second ohmic heating step and the heat insulated conduit(s) used in the second holding step sterility of the pumpable composition may be maintained.

In particular embodiments, the method of heating as disclosed herein does not comprise a mixing, blending, mingling and/or stirring of the pumpable composition in any of steps b) to e), preferably in any of steps b) to g), more preferably in any of steps a) to g).

In particular embodiments, the pumpable composition has a flow of at least 200 l/h, at least l/h, at least 250 l/h, at least 300 l/h, at least 350 l/h, at least 400 l/h, at least 450 l/h, or at least 500 l/h, preferably at least 400 l/h in any of steps b) to e), preferably in any of steps b) to g), of the method of heating as disclosed herein.

A further aspect may relate to a pumpable composition obtained by the method of heating as disclosed herein. The composition obtained by the method of heating as disclosed herein may be stable at 4° C. or at room temperature (i.e. ambient temperature) for a time period of at least 3 months, at least 6 months, at least 9 months, at least 12 months, at least 18 months, at least 24 months, or at least 30 months, preferably at least 18 months, in the absence of any preservative, preferably in the absence of any non-natural preservative such as potassium sorbate, sodium benzoate or sulfur dioxide.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The herein disclosed aspects and embodiments of the invention are further supported by the following non-limiting examples.

EXAMPLES

Example 1: Food Preparation Comprising Cherries

TABLE 1

| list of ingredients (% w/w): | |
| --- | --- |
| Sour Cherries (Pandy, Hungary) | 70 |
| Sugar (sucrose) | 10 |
| Water | 7 |
| Glucose Syrup | 6 |
| Colouring agent | 1 |
| Modified Waxy Maize Starch | 5 |
| Trisodium Citrate Dihydrate | 0.25 |
| Calcium Chloride Solution (36%) | 0.25 |
| Citric acid Solution (50%) | 0.25 |
| Flavour | 0.25 |

Composition Preparation
Mix starch with cold water and glucose syrup under high shear
Transfer in a scraped and heated kettle and heat to 65° C.
Add the sugar and colouring agent and mix.
Add the cherries and let the temperature increase till 40° C. under soft and alternated agitation (1 min on, 1 min off, and 1 min clock-wise, 1 min counter-clock-wise).
Add buffering salts and acids
Composition Properties:
Brix=32.5°B
pH=3.37
Conductivity: 0.235 S/m.
Heating Process as Disclosed Herein
i) First Ohmic Step
The composition is pumped (piston pump, Bertolli) through the first stage or unit of an ohmic heater pilot line (Catelli Food Technology), made of 2 glass tubes with an internal diameter of 50 mm and equipped with stainless steel electrodes. The process parameters are the following:
Composition flow: 400l/h
Initial back-pressure: 4 bars
Targeted heating temperature: 69° C.
Applied power: 16 kW
ii) First Holding Step
The three-stage/unit ohmic heater pilot has been modified by insertion of a 160 cm length insulated tubing (diameter 50 mm) between the first and the second ohmic heating stages/units.
The residence time of the composition in the first holding step is about 0.5 min (0.47 min).

The temperature of the composition at the exit of the insulated tubing is 67° C.

iii) Second Ohmic Heating Step

After the first holding step the composition is returned to the ohmic heater pilot to pass through the second and the third ohmic heating stages/units of the device. The processing parameters are the following:
temperature reached: 96° C.
Composition flow: 400l/h
Targeted temperature: 96° C.

iv) Second Holding Step

After the second ohmic heating step, the composition passed through an 400 cm length insulated tubing (diameter 50 mm).

The pasteurization value (PO) is 1.48 min.

The residence time of the composition in the second holding step is about 1.2 min (1.18 min).

The temperature of the composition at the exit of the insulated tubing is 94° C.

v) Cooling Step

The food preparation is passed through a tubular heat exchanger at a cooling rate of 8.3° C./min till the temperature of the food preparation is below 40° C.

vi) Packing

The product is packed in pouch bags of approximately 5 kg, through an aseptic bag filler with a 2 inches spout (Labopack from Catelli Food Technologies).

Samples are taken at regular intervals thought-out the process for evaluation.

Comparative Heating Process 1: Conventional Batch Cooking

Mix starch with cold water and glucose syrup under high shear in a kettle
Add the cherries to an horizontal mixer (steam-heated and scraped) and start heating slowly, under soft and alternated agitation (1 min on, 1 min off, and 1 min clock-wise, 1 min counter-clock-wise).
Transfer the starch/glucose mixture to the horizontal mixer containing the cherries
Add the sugar and colouring agent and mix.
Let the temperature increase till 40° C. under soft and alternated agitation (1 min on, 1 min off, and 1 min clock-wise, 1 min counter-clock-wise).
Give a resting period of 15 minutes
Add buffering salts and acids
Start heating with steam jacket with surface scraped under agitation (20 to 60 rpm) up to 75-80° C.
Cool down with cooling jacket with surface scraped under agitation (20 to 60 rpm) down to 65-70° C.
Pack the product as above
Food Preparation Properties:
Brix=32.5°B
pH=3.37

Comparative Heating Process 2: Heating Process Comprising Only One Ohmic Heating Step The same composition containing cherries has been submitted to the same process as in the "Process according to the invention" with the exception that the first holding step has been omitted.

Targeted temperature at the end of the ohmic heating step is 96° C.

An uncontrolled thickening of the starch was observed during the ohmic heating step, leading to the boiling of the food composition in the tubes and to the formation of a non-homogeneous product.

No food preparation could be recovered at the end of the process.

Comparative Heating Process 3: Heating Process with a Different Initial Back Pressure The same composition containing cherries has been submitted to the same process as in the "Process according to the invention" with the exception that the initial back pressure has been set to 3 bars.

Uncontrolled boiling of the food preparation was observed at the start of the operation. Full process could not be performed.

No food preparation could be recovered.

Product Evaluation: Fruit Recovery and Fruit Integrity

Weigh about 0.5 kg of fruit preparation (=start weight)
Weigh a sieve (sieve weight)
Put the fruit preparation on the sieve and rinse the filling until all the gel surrounding the fruits is washed off
Dry the bottom of the sieve and weigh the remaining quantity (weight pieces after rinsing=(remaining quantity weight−weight of the sieve))
Sort the fruit pieces in two groups: intact fruits and damaged fruits and weigh them separately (intact fruits weight and damaged fruits weight).

$$\text{fruit recovery}(\%) = \frac{\text{weight pieces after rinsing}(g)}{\text{start weight}(g) * \text{initial fruit}\%} * 100$$

$$\text{fruit integrity}(\%) = \frac{\text{intact fruits weight}(g)}{\text{weight pieces after rinsing}(g)} * 100$$

$$\text{damaged fruits}(\%) = \frac{\text{damaged fruits weight}(g)}{\text{weight pieces after rinsing}(g)} * 100$$

Sum of fruit integrity percentage and damaged fruits percentage may be less than 100 due to the presence of some fruit debris and residual rinsing water in the preparation.

The results of the evaluation are presented in Table 2.

TABLE 2

|  | Fruit recovery (%) | Fruits integrity (%) | Damaged fruit (%) |
| --- | --- | --- | --- |
| Heating process as disclosed herein | 75-85% | 70% | 20-25% |
| Comparative heating process 1 | 50-60% | 60% | 30% |
| Comparative heating process 2 | Not applicable | Not applicable | Not applicable |
| Comparative heating process 3 | Not applicable | Not applicable | Not applicable |

The results show that, with the process according to the invention, more fruits are recovered, and that they are more intact than with a conventional technology.

The invention claimed is:

1. A method for heating a pumpable composition comprising individually distinguishable edible inclusions comprising the steps of:
 a) providing a pumpable composition comprising from 2% to 7% (w/w) of starch, and at least 20% (w/w) individually distinguishable edible inclusions;

b) applying a first ohmic heating treatment to the composition in a continuous ohmic heater, wherein the composition has at the end of the first ohmic heating treatment a temperature ranging from 60° C. to 95° C.;

c) applying a first holding step to the composition in the absence of ohmic heating, wherein the temperature of the composition at the end of the first holding step is at most 5° C. lower compared to the temperature of the composition at the end of the first ohmic heating treatment;

d) applying a second ohmic heating treatment to the composition in a continuous ohmic heater, wherein the composition has at the end of the second ohmic heating treatment a temperature ranging from 75° C. to 110° C. and wherein the temperature of the composition at the end of the second ohmic heating treatment is at least 5° C. higher compared to the temperature of the composition at the end of the first ohmic heating treatment; and e) applying a second holding step to the composition in the absence of ohmic heating, wherein the temperature of the composition at the end of the second holding step is at most 5° C. lower compared to the temperature of the composition at the end of the second ohmic heating treatment;

wherein steps a) to e) are performed as a continuous process with an initial back pressure of at least 4 bar.

2. The method according to claim 1, wherein the pumpable composition comprises from 20% to 88% (w/w) of individually distinguishable edible inclusions.

3. The method according to claim 1, wherein the pumpable composition has an electrical conductivity of at least 0.014 S/m at 20° C. before applying the first ohmic heating treatment.

4. The method according to claim 1, wherein the average size of the individually distinguishable edible inclusions ranges from 5 mm to 50 mm.

5. The method according to claim 1, wherein the first holding step is applied for a time period of between 0.2 min and 10 min and/or wherein the second holding step is applied for a period of between 0.25 min and 5 min.

6. The method according to claim 1, wherein the composition is not subjected to a heat treatment in the first and/or the second holding step(s).

7. The method according to claim 1, wherein the first and second holding step each comprise passing the composition through one or more heat insulated conduit(s).

8. The method according to claim 1, wherein the edible inclusions are one or more edible inclusions selected from the group consisting of fresh whole fruits, frozen whole fruits, dried whole fruits, fresh fruit pieces, frozen fruit pieces, dried fruit pieces, grains, whole grains, seeds, whole seeds, nuts, nut pieces, whole vegetables, vegetable pieces, fish, fish pieces, meat, meat pieces, and combinations thereof.

9. The method according to any one of claims 1 to 8, wherein the pumpable composition further comprises one or more texturing agents, acidity regulators, spices, flavoring agents, coloring agents and/or aromatizing agents.

10. The method according to claim 1, further comprising, after the second holding step, cooling the composition to a temperature ranging from 4° C. to 45° C.

11. The method according to claim 10, wherein the cooling of the composition is performed at a cooling rate of at least 5° C./min.

12. The method according to claim 1, wherein providing the pumpable composition comprises sugar or a sugar substitute.

13. The method according to claim 12, wherein composition comprises from 10% to 40% (w/w) of the sugar or sugar substitute.

14. The method according to claim 1, further comprising packing the composition.

* * * * *